United States Patent
Kim et al.

(10) Patent No.: US 12,269,349 B2
(45) Date of Patent: Apr. 8, 2025

(54) APPARATUS AND METHOD FOR CONTROLLING OPERATION OF ELECTRIC VEHICLE

(71) Applicant: Hyundai Kefico Corporation, Gyeonggi-Do (KR)

(72) Inventors: Hyun Seung Kim, Gyeonggi-do (KR); Se Hee Byun, Seoul (KR); In Keun Seo, Gyeonggi-do (KR); Sil Lo Jin, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 190 days.

(21) Appl. No.: 17/912,302

(22) PCT Filed: Mar. 17, 2021

(86) PCT No.: PCT/KR2021/003305
§ 371 (c)(1),
(2) Date: Sep. 16, 2022

(87) PCT Pub. No.: WO2021/187894
PCT Pub. Date: Sep. 23, 2021

(65) Prior Publication Data
US 2023/0158894 A1    May 25, 2023

(30) Foreign Application Priority Data
Mar. 18, 2020  (KR) .................. 10-2020-0033140

(51) Int. Cl.
*B60L 15/20*      (2006.01)
*B60L 58/12*      (2019.01)
(Continued)

(52) U.S. Cl.
CPC ............... *B60L 15/20* (2013.01); *B60L 58/12* (2019.02); *B60W 40/04* (2013.01); *B60W 50/10* (2013.01);
(Continued)

(58) Field of Classification Search
CPC .... B60L 15/20; B60L 58/12; B60L 2240/423; B60L 2240/642; B60L 2240/68;
(Continued)

(56) References Cited

U.S. PATENT DOCUMENTS

2006/0033337 A1* 2/2006 Kojima .................. B60K 6/442
                                                290/40 C
2010/0312422 A1  12/2010 Imaseki
(Continued)

FOREIGN PATENT DOCUMENTS

JP   2012170282 A * 9/2012
KR   100802680 B1   2/2008
(Continued)

OTHER PUBLICATIONS

Office Action issued Nov. 28, 2022 in Indian Application No. 202247052435.
(Continued)

*Primary Examiner* — Ig T An
*Assistant Examiner* — Christine Nguyen Huynh
(74) *Attorney, Agent, or Firm* — Fox Rothschild LLP

(57) ABSTRACT

An apparatus for controlling operation of an electric vehicle of the present invention may comprise: an operation information collection unit that collects parameters for operation of an electric vehicle; a battery information collection unit that collects information on battery operation and condition; a manipulation information collection unit that collects manipulation information of a driver on the electric vehicle; a motor control means for driving a driving motor of the
(Continued)

electric vehicle according to the collected manipulation information from the driver; and a derating adjustment unit that performs derating for reducing a ratio of an amount of power of the driving motor to a throttle angle, according to the collected information.

15 Claims, 8 Drawing Sheets

(51) Int. Cl.
    *B60W 40/04*     (2006.01)
    *B60W 50/10*     (2012.01)

(52) U.S. Cl.
    CPC ... *B60L 2240/423* (2013.01); *B60L 2240/642* (2013.01); *B60L 2240/68* (2013.01); *B60L 2250/26* (2013.01)

(58) Field of Classification Search
    CPC ............. B60L 2250/26; B60L 2240/12; B60L 2240/16; B60L 2240/18; B60L 2240/421; B60L 2240/545; B60L 2240/549; B60L 2250/16; B60L 58/10; B60L 2240/10; B60L 2240/42; B60L 2240/54; B60W 40/04; B60W 50/10; Y02T 10/64; Y02T 10/70; Y02T 10/72; H02P 29/00
See application file for complete search history.

(56) References Cited

U.S. PATENT DOCUMENTS

| | | | |
|---|---|---|---|
| 2013/0107404 A1* | 5/2013 | Hamai | ............ H02H 9/02 361/63 |
| 2014/0183938 A1* | 7/2014 | Peswani | ............ B60L 3/0046 307/9.1 |
| 2016/0167641 A1 | 6/2016 | Yoon | |
| 2019/0168621 A1 | 6/2019 | Healy | |

FOREIGN PATENT DOCUMENTS

| KR | 10-2016-0071211 A | | 6/2016 |
|---|---|---|---|
| KR | 20160071211 A | * | 6/2016 |
| KR | 101752594 B1 | | 7/2017 |

OTHER PUBLICATIONS

International Search Report issued on Jun. 29, 2021 in corresponding PCT Application No. PCT/KR2021/003305.

Office Action issued on Jan. 24, 2025 in corresponding Chinese Patent Application No. 2018022130.3.

* cited by examiner

APPARATUS AND METHOD FOR CONTROLLING OPERATION OF ELECTRIC VEHICLE

CROSS-REFERENCES TO RELATED APPLICATIONS

This application is a U.S. National Stage Entry of the International Patent Application No. PCT/KR2021/003305 filed on Mar. 17, 2021, which claims the benefit of priority of Korea Patent Application No. 10-2020-0033140 filed on Mar. 18, 2020, which are incorporated herein by reference in their entirety.

TECHNICAL FIELD

The present invention relates to an apparatus and method for controlling operation of an electric vehicle, and more particularly, to an apparatus and method for controlling the operation of an electric vehicle that does not degrade driving stability or comfort while increasing a remaining driving distance according to a battery charge amount or increasing a battery life.

BACKGROUND ART

Recently, in order to protect the global environment, the use of an internal combustion engine that is a source of harmful gas has been avoided, and an electric vehicle that drives the electric vehicle using electric power that is a non-polluting power source is attracting attention.

In general, an electric vehicle is a vehicle that obtains power by driving an AC or DC motor mainly using a power of a battery. Various technologies are being researched and developed for practical use of such an electric vehicle, and, particularly, a system with high output, small size and high efficiency are being developed according to the development of motor/control technology, in particular, many developments and developments in the field of an electric motor.

Such an electric vehicle is equipped with a battery (storage battery) and uses a power of the storage battery as a power source, and can be used variously for such as a small electric scooter, an electric wheelchair, a golf car, etc.

Meanwhile, there are fundamental disadvantages in such an electric vehicle due to a limited battery capacity and a limited battery life compared to conventional internal combustion engine vehicles. In order to overcome these disadvantages, there have been developed various technologies for a battery having a high energy density and a battery life extension in the field of lithium batteries and the like However, in the case of a two-wheeled electric vehicle, a space for mounting a battery is insufficient compared to a passenger vehicle or the like, and since its main market aims to a relatively low-end market, it is difficult to adopt an expensive, high-efficiency, long-life battery.

Under the above-described restrictive conditions, in order to increase a battery driving time or battery life of the two-wheeled electric vehicle, it can be considered to force a motor driving method thereof to drive most fuel-efficiently through a vehicle operation control unit (VCU).

However, limiting a motor output has a negative effect on drivability, in particular, on the driving stability or driving convenience/comfort of the two-wheeled vehicle.

DISCLOSURE

Technical Problem

Accordingly, the present invention is to provide an apparatus and/or method for controlling operation of an electric vehicle that does not degrade the driving stability or comfort while increasing a remaining driving distance according to the battery charge amount or increasing the battery life.

Technical Solution

An apparatus for controlling operation of an electric vehicle according to an aspect of the present invention may include: an operation information collection unit configured to collect parameters for operating of an electric vehicle; a battery information collection unit configured to collect information about battery operation and status; a manipulation information collection unit configured to collect manipulation information of a driver on the electric vehicle; a motor control means configured to drive a driving motor of the electric vehicle according to the collected manipulation information of the driver; and a derating adjustment unit configured to perform derating for reducing a ratio of a power amount of the driving motor to a throttle opening according to the collected information.

Here, the motor control means may control an output of the driving motor according to a function line of at least one of an output torque amount, an amount of motor-applied-current, an amount of motor-applied-power, an amount of inverter-applied-current and an amount of inverter-applied-power, and a throttle opening of the electric vehicle, the derating adjustment unit may adjust at least one of an overall slope, an average slope, an upper limit, and a lower limit of the function line according to the collected information.

Here, when an amount of charge of the battery is equal to or less than a reference value, the derating adjustment unit may lower the overall slope or the average slope of the function line, or apply the upper limit thereto.

Here, when a current gradient of the electric vehicle is greater than or equal to a reference angle and a speed of the electric vehicle is less than or equal to a predetermined reference speed, the derating adjustment unit may not perform any derating on the function line or may apply the lower limit with respect to the function line.

Here, when it is determined that acceleration and braking of the electric vehicle are repeated in a short period of time, the derating adjustment unit may apply the upper limit with respect to the function line or lower the overall slope or the average slope thereof.

Here, when manipulation information indicating an intention to accelerate is input from the driver, the derating adjustment unit may not perform any derating on the function line.

Here, in order to control the power amount of the driving motor, the derating adjustment unit may lower a battery output power, lower a power applied to the driving motor or an inverter, or reduce an effective pulse width of a pulse width modulation PWM driving the inverter.

Here, a battery control means configured to adjust a battery output amount according to an operation condition of the electric vehicle may be further included.

Here, the battery control means may transmit a control instruction to a battery management system BMS of the electric vehicle, and the motor control means may transmit a control instruction to a motor control unit MCU of the electric vehicle.

Here, a traffic information collection unit configured to collect information on a traffic condition of a next route based on a current driving road or a scheduled driving route.

A method for controlling operation of an electric vehicle according to another aspect of the present invention may include: generating a function line of a throttle opening and an output torque amount of the electric vehicle; collecting parameters for operating of the electric vehicle and manipulation information of a driver on the electric vehicle; adjusting the function line with respect to at least one of an overall slope, an average slope, an upper limit, and a lower limit according to the collected information; and controlling a driving motor of the electric vehicle with an output torque amount obtained by applying a throttle opening according to manipulation of the driver to the adjusted function line.

Here, in the step of adjusting the function line, when a current gradient of the electric vehicle is greater than or equal to a reference angle and a speed of the electric vehicle is less than or equal to a predetermined reference speed, no derating is performed on the function line or the lower limit may be applied to the function line.

Here, the method further includes collecting information on battery operation and status, and in the step of adjusting the function line, when an amount of charge of the battery is less than or equal to a reference value, the overall slope or the average slope of the function line may be lowered, or the upper limit may be applied thereto.

Here, in the step of adjusting the function line, when it is determined that a road on which the electric vehicle is driving is congested, the overall slope or the average slope of the function line may be lowered or the upper limit may be applied thereto.

Here, in the step of adjusting the function line, when manipulation information indicating an intention to accelerate is input from the driver, derating may not be performed on the function line.

Advantageous Effect

By implementing the apparatus and/or method for controlling operation of an electric vehicle of the present invention according to the above-described configuration, the battery life can be advantageously increased while the driving stability or comfort is not degraded.

The apparatus and/or method for controlling operation of an electric vehicle of the present invention can advantageously improve fuel efficiency (electricity efficiency) by intended power saving of the electric vehicle motor.

The apparatus and/or method for controlling operation of an electric vehicle of the present invention can advantageously protect the battery and extend the battery life by operating the battery according to a battery temperature predictive.

The device and/or method for controlling operation of an electric vehicle of the present invention can advantageously enhance, even when traffic condition is congested, drivability by finely manipulating an acceleration force and reduce energy consumption due to unnecessary acceleration and deceleration by improving low-speed driving manipulability.

MODE FOR INVENTION

Figure 1:
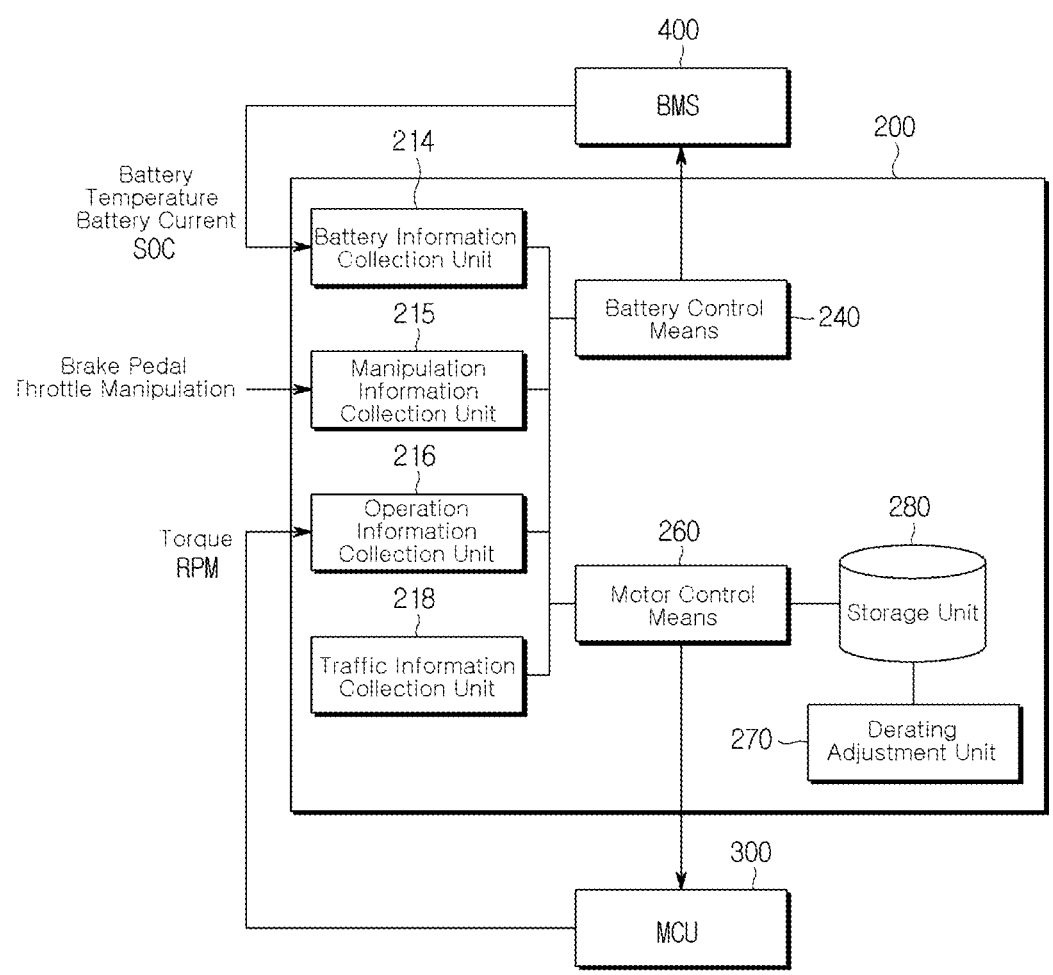
FIG. 1 is a block diagram illustrating an apparatus for controlling operation of an electric vehicle according to an embodiment of the present invention.

In describing the invention, the terms first, second, and the like may be used to describe various components, but the components may not be limited by the terms. The terms are used only for the purpose of distinguishing one component from the others. For example, without departing from the scope of the present invention, a first component may be referred to as a second component, and similarly, a second component may also be referred to as a first component.

In a case where a component is referred to as being connected to or coupled with another component, the component may be directly connected to or coupled with another component, but it may be understood that still another component may exist between the components.

The terms used herein are used for the purpose of describing particular embodiments only and are not intended to limit the invention. The singular expressions may include plural expressions unless the context clearly denotes otherwise.

It is to be understood that, in the present specification, the terms "comprising", "including", and the like are intended to specify the presence of features, numbers, steps, operations, elements, components, or combinations thereof described in the specification, but the terms do not preclude the presence or addition of one or more other features, numbers, steps, operations, elements, components, or combinations thereof.

In addition, shapes and sizes the elements in the drawings may be exaggerated for clarity.

FIG. 1 is a block diagram illustrating an apparatus for controlling operation of an electric vehicle according to an embodiment of the present invention.

The illustrated apparatus for controlling operation of an electric vehicle may include: an operation information collection unit 216 configured to collect parameters for operating of an electric vehicle; a battery information collection unit 214 configured to collect information about battery operation and status; a manipulation information collection unit 215 configured to collect manipulation information of a driver on the electric vehicle; a motor control means 260 configured to drive a driving motor of the electric vehicle according to the collected manipulation information of the driver; and a derating adjustment unit 270 configured to perform derating for reducing a ratio of a power amount of the driving motor to a throttle opening according to the collected information.

According to an implementation, a battery control means 240 configured to adjust a battery output amount according to an operation condition of the electric vehicle; and/or a traffic information collection unit 218 configured to collect information on a traffic condition of a next route based on a current driving road or a scheduled driving route may be further included.

As illustrated, the battery information collection unit 214 may receive battery-related information (battery temperature, battery charge/discharge current, battery SoC, etc.) from a BMS 400 provided in the electric vehicle, and the battery control means may transmit a control instruction to the BMS 400 of the electric vehicle.

As illustrated, the operation information collection unit 216 may receive driving-related information (torque, RPM, etc.) from a MCU 300 provided in the electric vehicle, and the motor control means may transmit a control instruction to the MCU 300 of the electric vehicle.

The manipulation information collection unit 215 may receive a displacement measurement value of each pedal (handle/lever) from manipulation position detection sensors installed in an accelerator pedal (or throttle handle) and a brake pedal (or brake lever) of the electric vehicle.

A storage unit 280 may be implemented as a storage area such as a non-volatile memory device such as a flash memory or a register provided inside a microcontroller, and information/data necessary for a function line operation to be described below or electric vehicle operation may be recorded therein.

The battery control means 240 is, in a normal case, for instructing a discharge amount and a charge amount to the BMS 400 of the battery.

The traffic information collection unit 218 may be wirely/wirelessly connected to a navigation device or a smart phone in which a navigation application is installed, and receive road condition information inputted from the devices or receive road condition information transmitted from a traffic information server supporting the navigation device or the smartphone navigation application.

Figure 2A:
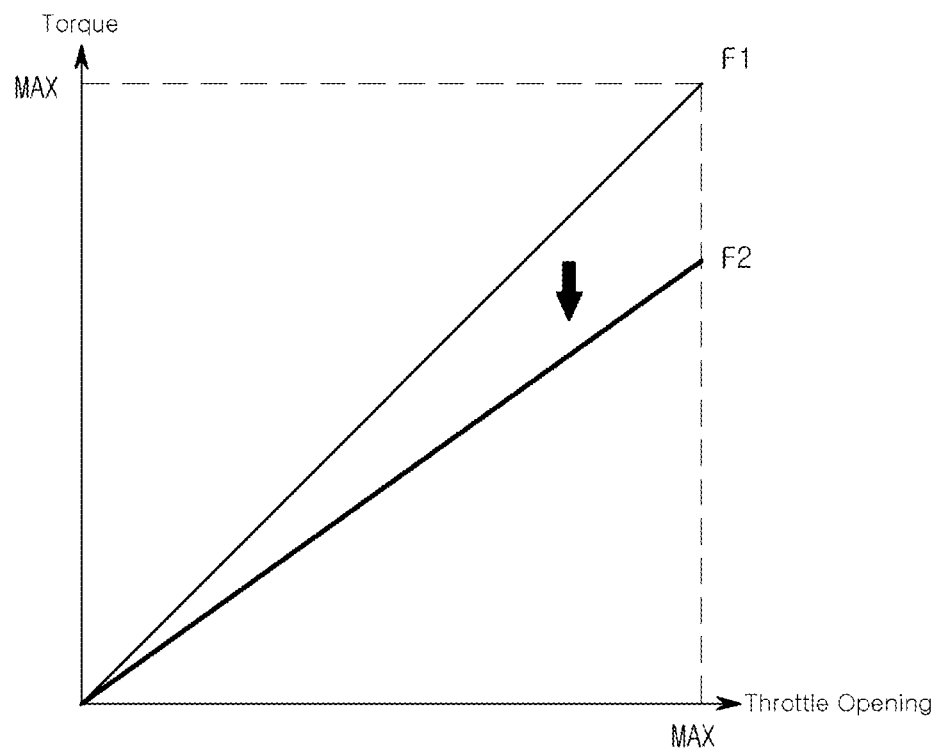
FIG. 2A is a graph showing a function line of a throttle opening and an output torque amount, which are primary references for performing an electric vehicle operation control according to the spirit of the present invention, and a function line in which an overall slope is adjusted.
Figure 2B:
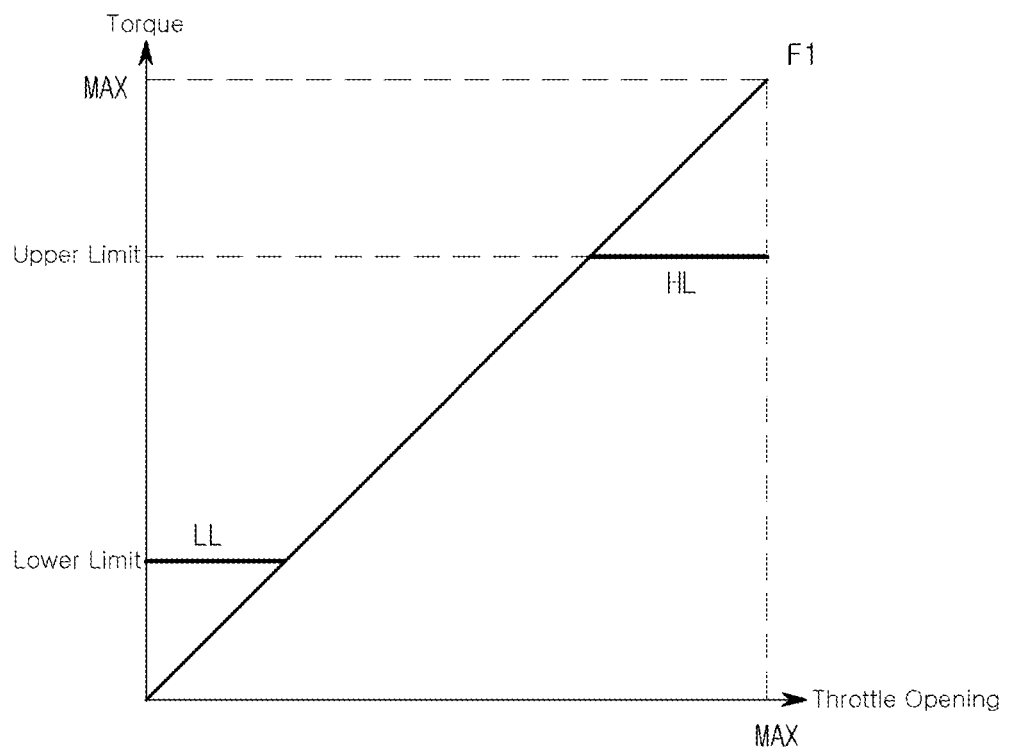
FIG. 2B is a graph showing a function line of a throttle opening and an output torque amount, which are primary references for performing an electric vehicle operation control according to the spirit of the present invention, and a function line that is adjusted by applying upper/lower limits.

FIGS. 2A and 2B are graphs illustrating a function line of a throttle opening and an output torque amount, which are primary references for performing an electric vehicle operation control according to the spirit of the present invention and an adjusted function line.

In the description of the present invention, a manipulation degree of the driver with respect to an acceleration (throttle) manipulation means will be referred to as a "throttle opening". In the case of a throttle handle in the form of a rotary handle of a general two-wheeled vehicle, a manipulation angle of the throttle handle may be the throttle opening.

In the case of controlling a simple electric vehicle, the driving motor outputs a torque with a power amount directly proportional to the throttle opening degree. For example, when the driver pulls the throttle to a maximum extent, the driving motor is driven with a maximum torque, and when the driver pulls the throttle to a half extent, the driving motor is driven with a torque half of the maximum torque.

On the other hand, in controlling the electric vehicle according to the spirit of the present invention, the throttle opening degree is searched in a predetermined function line, and the driving motor is controlled to output the searched power amount. Here, the function line represents a relationship between the throttle opening degree and the power amount.

For example, as shown by the line F1 in FIG. 2A, a function line in which the X-axis is the throttle opening and the Y-axis is the torque value may be used. In this case, in order to ease in implementation, the torque value of the Y-axis may be expressed as a percentage of the maximum torque value (MAX).

The function line generally has an almost straight line, but is not limited thereto, and may have a gentle curve shape when the driver's tendency is learned and derived.

The function line may be recorded in the storage unit 280 provided in the operation control device 200 as shown in FIG. 1.

Hereinafter, derating according to the spirit of the present invention will be described. The present invention suggests derating that lowers, compared to the normal driving, the output power amount compared to the throttle opening according to the judgment of the operating condition.

That is, in the present invention, derating means lowering the output (power) amount compared to the throttle opening. When derating is performed with respect to dynamic parameters, it will be the lowering of a ratio to the maximum torque (% ratio, etc.), an absolute torque amount, and an absolute/relative value of the acceleration under the condition of same throttle opening.

In addition, as another specific method for performing derating, a method of lowering a battery output power, lowering a power applied to the driving motor or the inverter, or reducing an effective pulse width of a pulse width modulation PWM driving the inverter.

The first purpose of derating is to increase a remaining driving distance according to the battery charge amount or to increase the battery life, and when the battery charge amount (e.g., SOC received from BMS) is equal to or less than a reference value, the overall slope or the average slope of the above function line may be lowered, or the upper limit may be applied. Here, sudden acceleration according to the driver's intention is allowed when the battery charge amount is equal to or more than the reference value, and sudden acceleration is limited for fuel efficiency (electricity efficiency) and the remaining driving distance when the battery charge amount is equal to or less than the reference value.

As shown in FIG. 2A, when vehicle control is performed based on the function line of the throttle opening and the output torque amount, derating may be performed by adjusting the overall slope of the function line of the throttle opening and the output torque amount. That is, derating may be applied as the line F2 of FIG. 2A.

Meanwhile, when the function line has a curved shape, not a straight line, derating may be performed by adjusting the average slope of the function line.

In addition, as another derating method suggested by the present invention, an upper limit and/or a lower limit may be applied to the Y-axis value (i.e., output torque amount) of the function line as shown in FIG. 2B. In FIG. 2B, the LL line represents the lower limit applicable to the F1 function line, and the HL line represents the upper limit applicable to the F1 function line.

Although the output torque is rather increased at a very low throttle opening degree when the lower limit is applied, it is applied for the purpose of preventing in advance the driver's high throttle opening, and thus classified under the category of derating.

The derating adjustment unit 270 of FIG. 1 may read the function line recorded in the storage unit 280, perform derating according to a predetermined condition, and record in the storage unit 280 again the function line to which the derating is applied.

Hereinafter, various conditions under which the derating adjustment unit 270 of FIG. 1 performs derating and a detailed derating performing method in each condition will be described.

When the motor control means 260 of FIG. 1 controls the output of the driving motor according to the function line of the throttle opening and the output torque amount of the electric vehicle, the derating adjustment unit 270 may adjust at least one of an overall slope, an average slope, an upper limit, and a lower limit of the function line according to various conditions indicated by the collected information. That is, the motor control means 260 controls the output of the driving motor according to the de-rated (adjusted) function line.

In the case of an implementation in which derating is performed in the simplest manner under the condition of the battery charge amount (SOC), the derating adjustment unit 270 may lower the overall slope or the average slope of the function line, or apply the upper limit when the charge amount of the battery (e.g., SOC received from the BMS) is less than or equal to the reference value.

Figure 3:
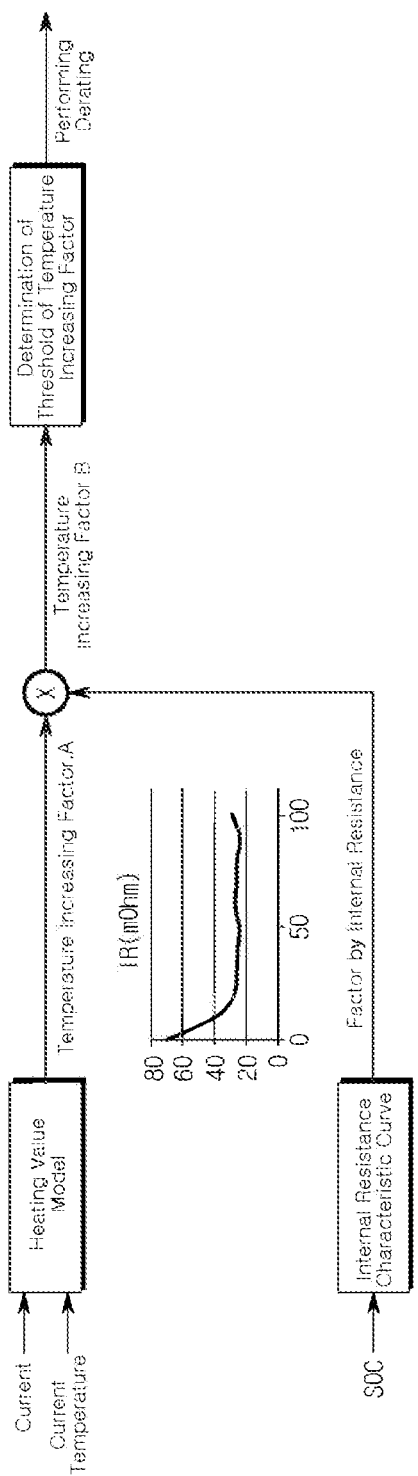
FIG. 3 is a block diagram illustrating a concept of performing derating under a condition of battery heat generation to which a battery temperature increase predictive mathematical model is applied.
Figure 4:
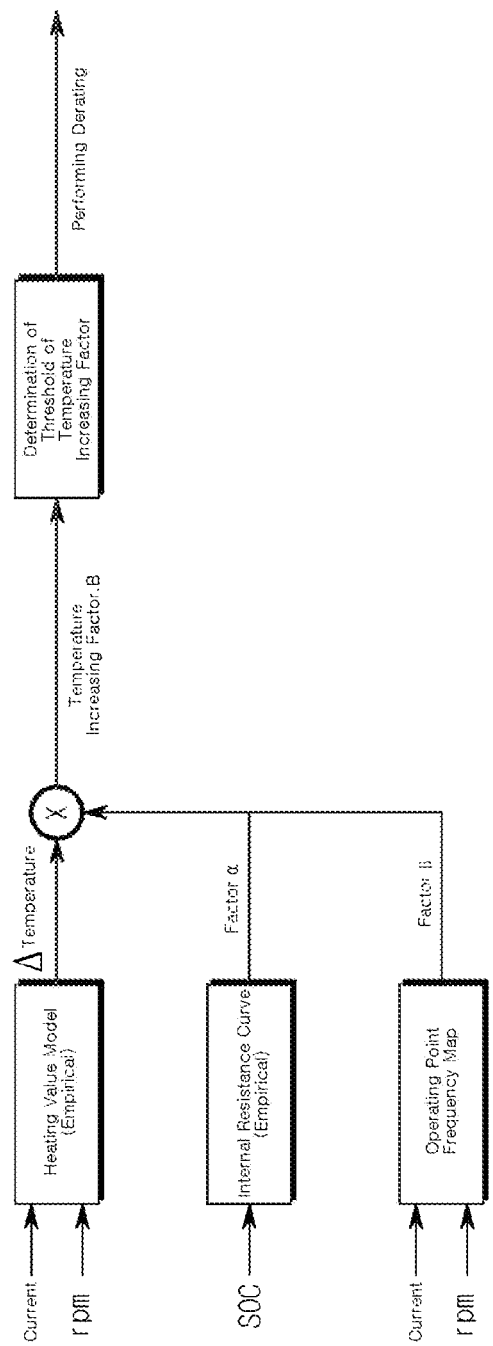
FIG. 4 is a block diagram illustrating a concept of performing derating under a condition for battery heat generation to which a battery temperature increase predictive empirical model is applied.

FIGS. 3 and 4 are block diagrams illustrating a concept of performing derating under a condition for more detailed battery heat generation. FIG. 3 shows a battery temperature increase predictive mathematical model applied thereto, and FIG. 4 shows a battery temperature increase predictive empirical model applied thereto.

FIG. 3 illustrates a configuration for performing derating through a battery temperature increase predictive mathematical model. In the illustrated configuration, the derating adjustment unit 270 may calculate a heating value model of the battery with reference to Equation 1 below and perform derating by calculating a temperature increasing factor by the heating value.

$$Q_s = T_{cell} \Delta S \frac{I}{nF} \quad \text{[Equation 1]}$$
$$Q_b = Ah(T_{cell} - T_{amb})$$
$$\dot{Q} = Q_p + Q_s - Q_b$$

In FIG. 3, the temperature increasing factor.B was calculated according to the temperature increasing factor.A and a factor of the internal resistance according to the SOC. In Equation 1, $Q=I^2R$ (internal resistance), F is a Faraday constant of $9.648670+0.00016\times104$ C/mol, and the entropy change ($\Delta S$) is usually a value of $-30$ J/mol·K during discharge.

A heating value empirical model can be added thereto, reflecting the empirical results observing temperature changes under the conditions with the fixed rpm and current and with the SOC changing from 100 to 0.

FIG. 4 shows a configuration for performing derating through a battery temperature increase predictive empirical model. In the illustrated configuration, the derating adjustment unit 270 obtains the A temperature using a current-RPM map. The temperature value where the battery temperature rises at a specific time (T) is measured at the current-RPM operating point, the temperature increasing factor.B is calculated by multiplying an internal resistance curve factor and a frequency factor of the operating point, and derating is performed according to the temperature increasing factor.B.

A method of obtaining the frequency factor of the operating point may be by determining the highest frequency of the operating point according to an actual road driving mode or a specific driving mode, and normalizing the same. It is determined that the driving time will be longer by increasing the time T as the operating point is frequent, so that the temperature change factor may be increasingly reflected.

Also, the temperature increasing due to the increase in internal resistance according to the SOC can be multiplied by a factor using a separate curve.

Figure 5A:
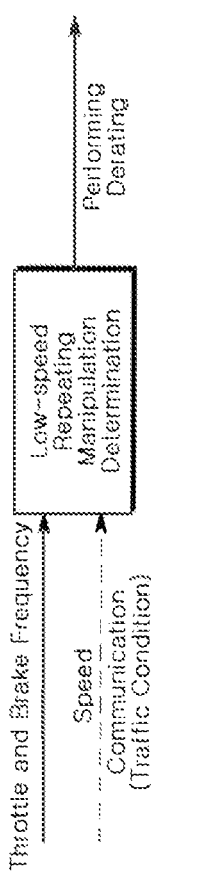
FIG. 5A is a block diagram illustrating a concept of performing derating under a condition of a congested road condition.
Figure 5B:
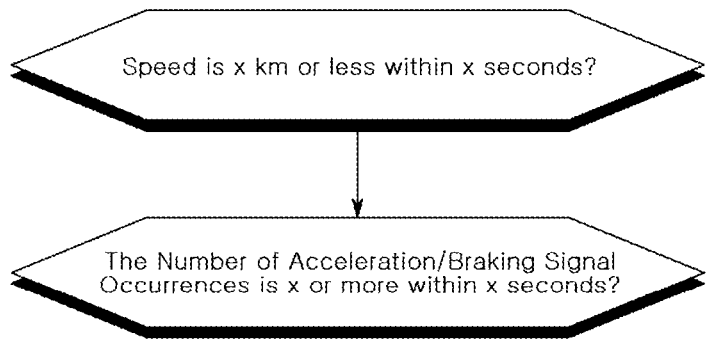
FIG. 5B is a flowchart illustrating a concept of performing derating under a condition of a congested road condition.

FIGS. 5A and 5B are a block diagram and a flowchart illustrating a concept of performing derating under the condition of a congested road condition.

The most accurate determination for the congested road condition is to use the traffic information collection unit 218 shown in FIG. 1. However, in reality, it is not easy to provide the traffic information collection unit 218 in a two-wheeled electric vehicle that is relatively low priced and has a simple electronic device connection relationship. Therefore, in the configuration of FIG. 5A, a main determination on the congested road condition is performed based on the information on the manipulation of the throttle and the brake, which is information that is easy to obtain for the operation control device 200 of the two-wheeled electric vehicle, and when external traffic information can be collected, it can be reflected immediately.

In the illustrated configuration, the derating adjustment unit 270 is a low-speed repeating manipulation determination unit, which collects information on manipulation of the throttle and brake for a predetermined period, and determines whether to perform derating by analyzing the collected manipulation information. Here, derating may be performed to prevent the risk of a sudden start of the electric vehicle driving on a congested road and to improve manipulability of repeated low-speed driving. To this end, the low-speed repeating manipulation determination unit may determine low-speed repeating manipulability, calculate a speed from RPM, and receive a traffic condition from an external traffic information providing server having a communication channel therewith.

For example, when the acceleration and braking of the electric vehicle are repeated more than a predetermined number of times during a predetermined reference time, which is a short-term period, the derating adjustment unit 270 may anticipate that the vehicle driving will repeat stop-and-go because the current road is congested, and apply the upper limit to the function line. Then, the output value (torque value) of the driving motor is limited even when the driver increases the acceleration manipulation (e.g., pulling the throttle handle) larger than necessary due to emotional instability or misunderstanding caused by repeated acceleration/braking manipulation, and accordingly a sudden acceleration of the electric vehicle in a low-speed section may be prevented.

For example, the derating adjustment unit 270 may lower the overall slope of the function line when the acceleration and braking of the electric vehicle are repeated more than the predetermined number of times during the predetermined reference time, which is a short period. Accordingly, when the traffic condition is congested, low-speed drivability can be improved by finely manipulating an acceleration force under the same throttle manipulation.

Figure 6:
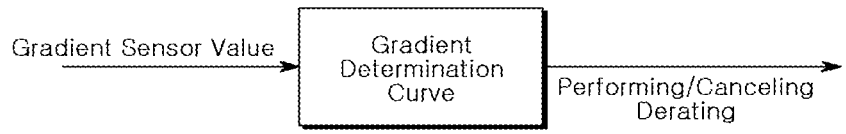
FIG. 6 is a block diagram illustrating a concept of performing derating under a condition of a gradient of the electric vehicle (i.e., a gradient of the current road).

FIG. 6 is a block diagram illustrating a concept of performing derating under the condition of a gradient of the electric vehicle (i.e., a gradient of the current road).

In the illustrated configuration, the derating adjustment unit 270 may limit the derating factor according to the inventive concept of the present invention or cancel the derating, depending on the gradient. For example, it is possible to determine whether to cancel/perform derating by determining a downhill road/an uphill road according to the gradient of the road. Here, the gradient may be input from a gradient sensor.

A relatively inexpensive gradient sensor, similarly to the principle of a general acceleration sensor, has poor precision in a situation where the electric vehicle is significantly accelerating, and particularly, in the case of an uphill road, the derating may cause a driver's inconvenience usually at the time of stating the electric vehicle where the electric vehicle is in a low speed, but does not have significant effect when driving. In consideration of this situation, it is preferable to perform limiting/canceling of derating according to a gradient in a state where speed and/or acceleration are close to zero.

In this case, when the current gradient of the electric vehicle is greater than or equal to the reference angle and the speed and/or acceleration of the electric vehicle is less than or equal to the reference value, the derating adjustment unit 270 may not perform any derating on the function line, or the lower limit may be applied to the function line.

Here, when derating is performed at the time of starting the electric vehicle at a predetermined gradient, torque is rather reduced even in a situation in which a greater torque is required than usual, which may decrease driving comfort and reduce driving stability of the two-wheeled vehicle. In order to prevent this, when the electric vehicle starts where the current gradient is equal to or greater than the reference angle, derating in some or all of the conditions may be canceled.

Here, by applying the lower limit to the function line when the electric vehicle starts at the predetermined gradient, the electric vehicle may be prevented from being pushed at a low torque when starting on a gradient. In addition, when the electric vehicle is pushed at a low throttle opening, the driver may perform a sudden acceleration manipulation, and reducing driving stability or wasting energy thereby can be prevented by applying the lower limit to the function line.

When applying the lower limit, the lower limit may be set according to the magnitude of a value of the gradient sensor measured in a stationary state. For example, when the road gradient is high, the lower limit may be set to be large.

Figure 7:
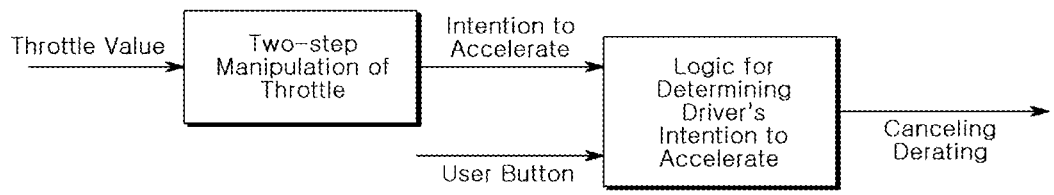
FIG. 7 is a block diagram illustrating a concept of limiting derating under a condition that a driver's intention to actively drive is received.

FIG. 7 is a block diagram illustrating a concept of limiting derating under a condition that a driver's intention to actively drive is received. In the illustrated configuration, the derating adjustment unit 270 may cancel the derating in all or some of the conditions according to the determination of the driver's intention.

As a method for determining the driver's intention to drive actively, a two-step manipulation (repeated pulling twice consecutively) of the throttle handle may be determined as an active driving intention. Alternatively, the driver's acceleration intention may be determined based on whether or not manipulating a driver's input means (e.g., a button) for indicating an intention to actively drive. When it is determined there is an intention to actively drive (willingness to accelerate), derating under all or some of the conditions may be canceled.

In summary, the derating adjustment unit 270 may not perform derating under some or all conditions of the function line when manipulation information indicating the intention to accelerate is input from the driver.

Figure 8:
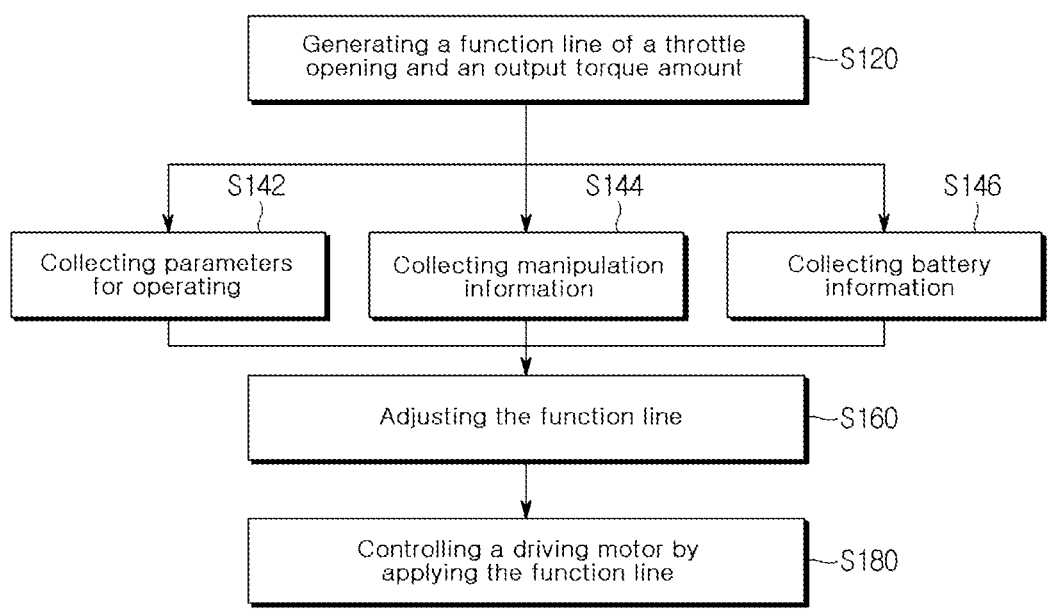
FIG. 8 is a flowchart illustrating a method for controlling operation of an electric vehicle according to an embodiment of the present invention.

FIG. 8 is a flowchart illustrating a method for controlling operation of an electric vehicle according to an embodiment of the present invention.

The illustrated method for controlling operation of an electric vehicle may include: generating a function line of a throttle opening and an output torque amount of the electric vehicle (S120); collecting parameters for operating of the electric vehicle and manipulation information of a driver on the electric vehicle (S142, S144); adjusting the function line with respect to at least one of an overall slope, an average slope, an upper limit, and a lower limit according to the collected information (S160); and controlling a driving motor of the electric vehicle with an output torque amount obtained by applying a throttle opening according to manipulation of the driver to the adjusted function line (S180).

The step S120 of generating the function line may be performed in such a manner that the motor control means 260 of FIG. 1 analyzes a driving pattern from the accumulated and collected driving parameters of the corresponding electric vehicle, generates a function line, and then records the function line in the storage unit 280. Otherwise, the step may be performed by receiving a function line of the corresponding vehicle from an external support server of the operation control method according to the spirit of the present invention and store the same in the storage unit 280 of FIG. 1.

The step S142 of collecting the driving parameters as shown may be performed by the operation information collection unit 216 of FIG. 1, and the step S144 of collecting the driver's manipulation information as shown may be performed by the manipulation information collection unit 215.

The step S160 of adjusting the function line may be performed by the derating adjustment unit 270 of FIG. 1, and derating reflecting various conditions of the derating adjustment unit 270 described above may be performed.

Accordingly, for example, in the step of adjusting the function line S160, when the current gradient of the electric vehicle is greater than or equal to the reference angle and the speed of the electric vehicle is less than or equal to the predetermined reference speed, no derating is performed with respect to the function line, and the lower limit may be applied to the function line.

For example, in the step of adjusting the function line (S160), the battery charge amount is less than or equal to the reference value, the overall slope or the average slope of the function line may be lowered, or the upper limit may be applied. To this end, the step (S146) of collecting information on battery operation and state may be performed together with the steps S142 and S144 of collecting the parameters/manipulation information for the operation.

For example, in the step of adjusting the function line (S160), when it is determined that the driving road is congested, the upper limit may be applied to the function line or the overall/average slope may be lowered.

For example, in the step of adjusting the function line (S160), when manipulation information indicating the intention to accelerate is input from the driver, any derating under all or some of the conditions may not be performed on the function line.

The step (S180) of controlling the driving motor with the function line as shown may be performed in such a manner that the throttle opening is received from the manipulation information collection unit 215 of FIG. 1, an output torque value (%) is obtained by applying the throttle opening that is input to the de-rated function line, and the obtained output torque value (%) is instructed to the MCU 300.

Those of ordinary skill in the art will recognize that the present invention may be embodied in other specific forms without departing from its spirit or essential characteristics. The described embodiments are to be considered in all respects only as illustrative and not restrictive. The scope of the present invention is therefore indicated by the appended claims rather than by the foregoing description. All changes which come within the meaning and range of equivalency of the claims are to be embraced within the scope of the present invention.

The invention claimed is:

1. An apparatus for controlling operation of an electric vehicle comprising:
    a control device including a controller and a storage unit, the storage unit configured to store instructions that, when executed by the controller, cause the control device to:
    operate the electric vehicle;
    collect information about battery operation and status;
    collect manipulation information of a driver on the electric vehicle;
    drive a driving motor of the electric vehicle according to the collected manipulation information of the driver; and
    perform derating for reducing a ratio of a power amount of the driving motor to a throttle opening according to the collected information by reducing an overall slope of a function line of the throttle opening and an output torque amount.

2. The apparatus for controlling operation of an electric vehicle of claim 1,
    wherein the control device is further configured to: control an output of the driving motor according to the function line of at least one of the output torque amount, an amount of motor-applied-current, an amount of motor-applied-power, an amount of inverter-applied-current and an amount of inverter-applied-power, and a throttle opening of the electric vehicle, and
    adjust at least one of an overall slope, an average slope, an upper limit, and a lower limit of the function line according to the collected information.

3. The apparatus for controlling operation of an electric vehicle of claim 2,
    wherein the control device is further configured to, when an amount of charge of the battery is equal to or less than a reference value, lower the overall slope or the average slope of the function line, or apply the upper limit thereto.

4. The apparatus for controlling operation of an electric vehicle of claim 2,
    wherein the control device is further configured to, when a current gradient of the electric vehicle is greater than or equal to a reference angle and a speed of the electric vehicle is less than or equal to a predetermined reference speed, not perform any derating on the function line or applies the lower limit with respect to the function line.

5. The apparatus for controlling operation of an electric vehicle of claim 2,
    wherein the control device is further configured to, when it is determined that acceleration and braking of the electric vehicle are repeated in a short period of time, apply the upper limit with respect to the function line or lower the overall slope or the average slope thereof.

6. The apparatus for controlling operation of an electric vehicle of claim 2,
    wherein the control device is further configured to, when manipulation information indicating an intention to accelerate is input from the driver, not perform any derating on the function line.

7. The apparatus for controlling operation of an electric vehicle of claim 1,
    wherein the control device is further configured to, in order to control the power amount of the driving motor, the derating adjustment unit lowers a battery output power, lower a power applied to the driving motor or an inverter, or reduce an effective pulse width of a pulse width modulation PWM driving the inverter.

8. The apparatus for controlling operation of an electric vehicle of claim 1, wherein the control device is further configured to:
    adjust a battery output amount according to an operation condition of the electric vehicle.

9. The apparatus for controlling operation of an electric vehicle of claim 8, wherein the control device is further configured to:
    transmit a control instruction to a battery management system (BMS) of the electric vehicle, and
    transmit a control instruction to a motor control unit (MCU) of the electric vehicle.

10. The apparatus for controlling operation of an electric vehicle of claim 1, wherein the control device is further configured to:
    collect information on a traffic condition of a next route based on a current driving road or a scheduled driving route.

11. A method for controlling operation of an electric vehicle comprising:
    generating a function line of a throttle opening and an output torque amount of the electric vehicle;
    collecting parameters for operating of the electric vehicle and manipulation information of a driver on the electric vehicle;
    adjusting the function line with respect to at least one of an overall slope, an average slope, an upper limit, and a lower limit according to the collected information;
    controlling a driving motor of the electric vehicle with the output torque amount obtained by applying the throttle opening according to manipulation of the driver to the adjusted function line; and
    performing derating for reducing a ratio of a power amount of the driving motor to the throttle opening according to the collected information by reducing an overall slope of the function line of the throttle opening and the output torque amount.

12. The method for controlling operation of an electric vehicle of claim 11,
    wherein, in the step of adjusting the function line, when a current gradient of the electric vehicle is greater than or equal to a reference angle and a speed of the electric vehicle is less than or equal to a predetermined reference speed, no derating is performed on the function line or the lower limit is applied to the function line.

13. The method for controlling operation of an electric vehicle of claim 11, further comprising:
    collecting information on battery operation and status, wherein in the step of adjusting the function line, when an amount of charge of the battery is less than a reference value, the overall slope or the average slope of the function line is lowered, or the upper limit is applied thereto.

14. The method for controlling operation of an electric vehicle of claim 11,
wherein, in the step of adjusting the function line, when it is determined that a road on which the electric vehicle is driving is congested, the overall slope or the average slope of the function line is lowered or the upper limit is applied thereto.

15. The method for controlling operation of an electric vehicle of claim 11,
wherein, in the step of adjusting the function line, when manipulation information indicating an intention to accelerate is input from the driver, derating is not performed on the function line.

\* \* \* \* \*